(12) United States Patent
Kumar et al.

(10) Patent No.: US 11,301,783 B1
(45) Date of Patent: Apr. 12, 2022

(54) DISAMBIGUATING BETWEEN USERS

(71) Applicant: Amazon Technologies, Inc., Seattle, WA (US)

(72) Inventors: Dilip Kumar, Seattle, WA (US); Ammar Chinoy, Seattle, WA (US); Sudarshan Narasimha Raghavan, Snoqualmie, WA (US); Shrivatsan Vasudhevan, Sammamish, WA (US); Jin Dong Kim, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 201 days.

(21) Appl. No.: 16/734,230

(22) Filed: Jan. 3, 2020

Related U.S. Application Data

(63) Continuation of application No. 16/512,125, filed on Jul. 15, 2019, now Pat. No. 10,528,638, which is a continuation of application No. 13/966,270, filed on Aug. 13, 2013, now Pat. No. 10,353,982.

(51) Int. Cl.

| | | |
|---|---|---|
| *G06F 7/00* | (2006.01) | |
| *G06Q 10/00* | (2012.01) | |
| *G06F 17/00* | (2019.01) | |
| *G06Q 10/08* | (2012.01) | |
| *G06Q 50/28* | (2012.01) | |

(52) U.S. Cl.
CPC ............ *G06Q 10/00* (2013.01); *G06F 17/00* (2013.01); *G06Q 10/087* (2013.01); *G06Q 50/28* (2013.01)

(58) Field of Classification Search
CPC ...... G06Q 10/00; G06Q 50/28; G06Q 10/087; G06F 17/00

USPC .......................................... 700/213–216, 228
See application file for complete search history.

(56) References Cited

U.S. PATENT DOCUMENTS

| | | | | |
|---|---|---|---|---|
| 5,963,131 | A | * | 10/1999 | D'Angelo .......... G08B 13/1409 340/568.1 |
| 6,236,736 | B1 | | 5/2001 | Crabtree et al. |
| 6,659,344 | B2 | | 12/2003 | Otto et al. |
| 7,225,980 | B2 | | 6/2007 | Ku et al. |
| 7,949,568 | B2 | | 5/2011 | Fano et al. |
| 7,983,448 | B1 | | 7/2011 | Lobo et al. |
| 8,009,864 | B2 | | 8/2011 | Linaker et al. |
| 8,175,925 | B1 | | 5/2012 | Rouaix |
| 8,189,855 | B2 | | 5/2012 | Opalach et al. |
| 8,264,422 | B1 | | 9/2012 | Persson et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Yolanda R Cumbess
(74) *Attorney, Agent, or Firm* — Athorus, PLLC

(57) ABSTRACT

This disclosure describes a system for disambiguating between multiple potential users that may have performed an item action (e.g., item removal or item placement) at an inventory location. For example, if there are three picking agents (users) standing near an inventory location and one of the agents removes an item (item action) from the inventory location, the example systems and processes described herein may utilize various inputs to disambiguate between the users and determine which of the potential users performed the item action.

20 Claims, 8 Drawing Sheets

(56) References Cited

U.S. PATENT DOCUMENTS

| | | | |
|---|---|---|---|
| 8,325,036 B1* | 12/2012 | Fuhr | G08B 13/19613 340/540 |
| 8,423,431 B1 | 4/2013 | Rouaix et al. | |
| 8,571,702 B1 | 10/2013 | Haake et al. | |
| 8,630,924 B2 | 1/2014 | Groenevelt et al. | |
| 8,678,281 B2 | 3/2014 | Kangas et al. | |
| 8,688,598 B1 | 4/2014 | Shakes et al. | |
| 8,726,195 B2 | 5/2014 | Bill | |
| 9,235,928 B2 | 1/2016 | Medioni et al. | |
| 9,473,747 B2 | 10/2016 | Kobres et al. | |
| 9,574,894 B1* | 2/2017 | Karakotsios | H04W 4/02 |
| 2003/0002712 A1 | 1/2003 | Steenburgh et al. | |
| 2004/0181467 A1 | 9/2004 | Raiyani et al. | |
| 2006/0256082 A1 | 11/2006 | Cho et al. | |
| 2008/0055087 A1 | 3/2008 | Horii et al. | |
| 2008/0055194 A1 | 3/2008 | Baudino et al. | |
| 2008/0068170 A1 | 3/2008 | Ehrman et al. | |
| 2008/0077511 A1 | 3/2008 | Zimmerman | |
| 2008/0109114 A1 | 5/2008 | Orita et al. | |
| 2008/0174485 A1* | 7/2008 | Carani | G06Q 10/08 342/357.46 |
| 2008/0183326 A1 | 7/2008 | Danelski | |
| 2008/0260212 A1 | 10/2008 | Moskal et al. | |
| 2009/0066513 A1 | 3/2009 | Kondo et al. | |
| 2009/0121017 A1 | 5/2009 | Cato et al. | |
| 2009/0245573 A1 | 10/2009 | Saptharishi et al. | |
| 2009/0322533 A1 | 12/2009 | Bomba et al. | |
| 2010/0117959 A1 | 5/2010 | Hong et al. | |
| 2010/0138037 A1 | 6/2010 | Adelberg et al. | |
| 2010/0277277 A1 | 11/2010 | Green et al. | |
| 2011/0011936 A1 | 1/2011 | Morandi et al. | |
| 2011/0063108 A1 | 3/2011 | Aonuma et al. | |
| 2011/0295644 A1 | 12/2011 | Hara et al. | |
| 2012/0284132 A1 | 11/2012 | Kim et al. | |
| 2013/0076898 A1 | 3/2013 | Philippe et al. | |
| 2013/0110565 A1 | 5/2013 | Means, Jr. et al. | |
| 2013/0253700 A1 | 9/2013 | Carson et al. | |
| 2013/0265232 A1 | 10/2013 | Yun et al. | |
| 2013/0284806 A1 | 10/2013 | Margalit | |
| 2013/0290106 A1 | 10/2013 | Bradley et al. | |
| 2013/0310068 A1* | 11/2013 | Fischer | G01S 19/05 455/456.1 |
| 2014/0244429 A1 | 8/2014 | Clayton et al. | |
| 2014/0244447 A1 | 8/2014 | Kim et al. | |
| 2014/0244488 A1 | 8/2014 | Kim et al. | |
| 2014/0279294 A1 | 9/2014 | Field-Darragh et al. | |
| 2015/0012426 A1 | 1/2015 | Purves et al. | |
| 2015/0019391 A1 | 1/2015 | Kumar et al. | |
| 2015/0073907 A1 | 3/2015 | Purves et al. | |
| 2015/0365806 A1* | 12/2015 | Parviainen | G01C 21/20 455/457 |
| 2016/0187974 A1* | 6/2016 | Mallinson | A63F 13/5255 463/32 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

International Search Report and Written Opinion of PCT Application No. PCT/US2014/039474, dated Oct. 17, 2014.

International Search Report and Written Opinion of PCT Application No. PCT/US2014/043033, dated Oct. 29, 2014.

Vaive Kalnikaite et al., "How to Nudge In Situ: Designing Lambent Devices to Deliver Information Salience in Supermarkets", Ubicomp '11 Proceedings of the 13th International Conference on Ubiquitous Computing, 2011, pp. 11-20, Publisher: ACM New York, NY, USA.

* cited by examiner

DISAMBIGUATING BETWEEN USERS

CROSS-REFERENCE TO RELATED APPLICATIONS

This application is a Continuation of U.S. patent application Ser. No. 16/512,125, filed Jul. 15, 2019, entitled "Agent Identification and Disambiguation," which is a Continuation of U.S. Pat. No. 10,353,982, filed Aug. 13, 2013, issued Jul. 16, 2019, entitled "Disambiguating Between Users," the contents of which are herein incorporated by reference in their entirety.

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in a storage area, or fulfillment centers that can be used to replenish inventory located in the shopping areas and/or to satisfy orders for items that are placed through other channels (e.g., e-commerce). Other examples of entities that maintain inventory include libraries, museums, rental centers, and the like.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
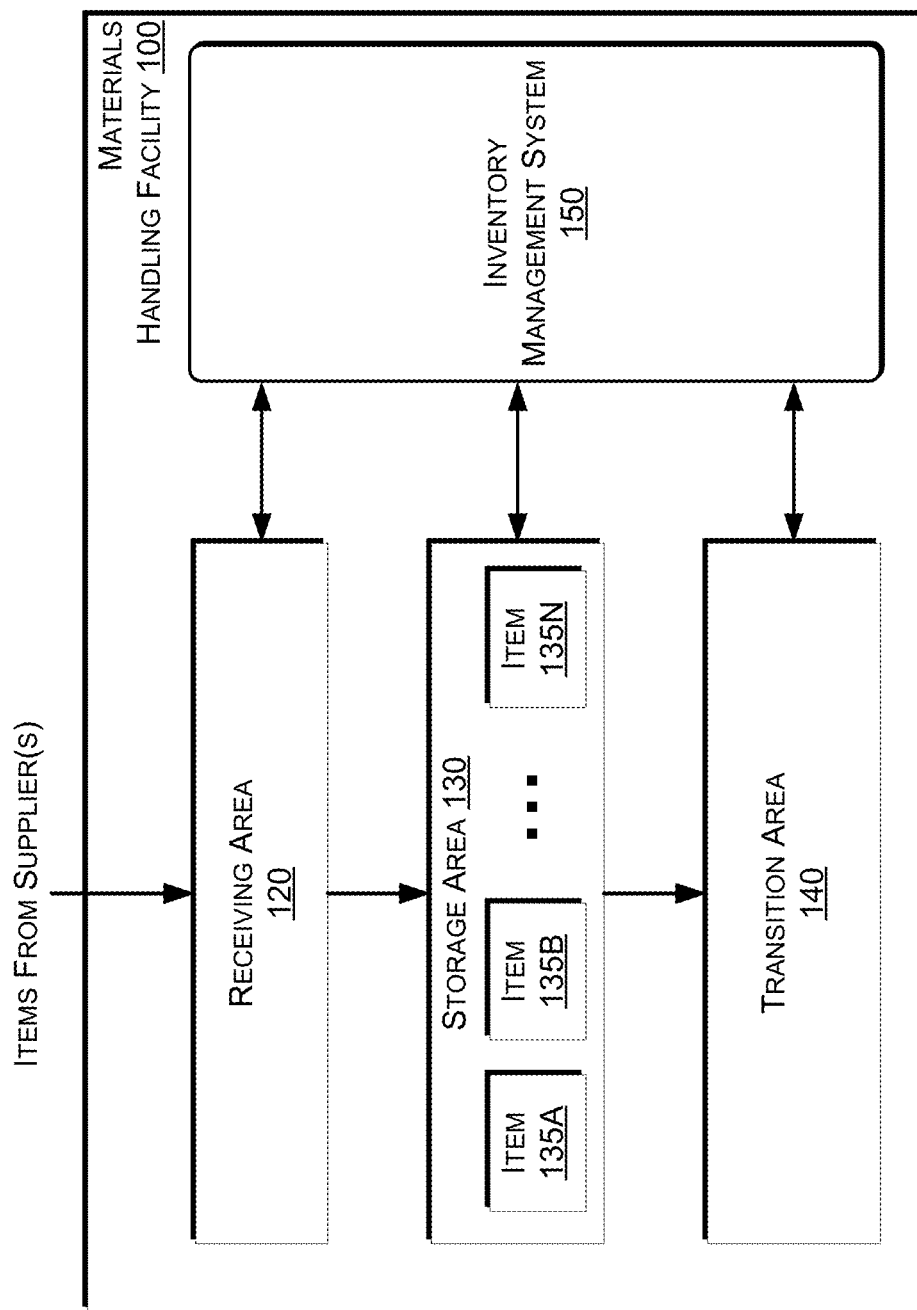
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes a system for disambiguating between multiple potential users that may have performed an item action (e.g., item removal, item placement) at an inventory location. For example, if there are three picking agents (users) standing near an inventory location and one of the agents removes an item (item action) from the inventory location, it may be difficult to determine which agent actually performed the item action. When users are standing near one another, even if we know the identity of each user, due to their close proximity with each other, it may be difficult to determine which of user actually performed the action.

In some implementations, users may wear or possess a user identifier, such as a radio frequency identifier (RFID) tag, and the user identifier may be detected to provide assistance to an inventory management system in determining which of the nearby users performed the item action.

For example, the inventory location may include an antenna array that includes multiple antennas positioned throughout the inventory location and configured to receive a user identifier when the user identifier is near the antenna. Likewise, the antennas may also receive item identifiers located on items that are removed and/or added to the inventory location. When an antenna receives an item identifier and/or a user identifier, that information may be provided to the inventory management system for use in determining the identity of the user that performed the item action.

In some implementations, a user identifier may not be detected or may not be sufficient to determine the identity of the user that performed the item action (e.g., more than one user identifier was detected). In such an instance, additional probabilistic factors may be considered to assist in disambiguating between the users to identify the user that actually performed the item action. For example, based on the item removed and the identity of the potential users, a probability may be determined for each potential user as to how likely it is that the user performed the item action for that item. The probability may consider the user's past purchase behavior, the items for which the user has previously performed item actions, temporary and/or permanent distinguishing features of the user, other items currently associated with the user (e.g., identified in the user's item list), etc. The user with the highest probability may be selected as the user that performed the item action.

In some implementations, a confidence score for the user with the highest probability may be determined based on the probability of that user and/or the probability determined for the other potential users. For example, if there are three potential users that may have performed the item action and the determined probabilities are 85%, 15%, and 5%, a high confidence score may be associated with the user having the highest probability because it is much more likely, in this example, that the user with the highest probability actually performed the item action. In comparison, if the probabilities were determined to be 85%, 83% and 67%, the user with the highest probability may receive a low confidence score because there is a high probability that more than one of the users performed the item action. In such a case, additional factors (e.g., further image analysis) may be performed to disambiguate between the users and determine which user actually performed the item action.

By disambiguating between potential users that may have performed an item action, the inventory management system can correctly associate items with users and provide appropriate item information to users. For example, if three users are all standing near one another and all three select an item from an inventory location, the methods and systems described herein provide the ability to disambiguate the users to determine which user selected which item. Based on that information, the inventory management system may provide item specific information to each user. For example, the inventory management system may notify each user of the selected items and/or provide information to those users about the items they selected.

Likewise, if an item is removed, once the potential users are disambiguated and the user that removed the item from the inventory location is determined, the item may be added to the user's item list. In comparison, if a user has placed an item in the inventory location, the item may be removed from the user's item list. These systems may also provide security measures to assist in detecting the placement of foreign objects into the materials handling facility. For example, if a user places an item into an inventory location, once the identity of the user is disambiguated from other potential users that are nearby, if the placed item is not included in the user's item list, it may be considered a foreign item with respect to the materials handling facility.

In some instances, a user may remove an item from an inventory location within the materials handling facility. Upon detecting the removal and disambiguating between potential users, the removed item is identified and associated with a user item list associated with the user that removed the item. For example, if the user is a picking agent, the picking agent may have an associated pick list identifying all the items that the picking agent is to pick from various inventory locations located in the materials handling facility. When the picking agent picks an item, the item is identified and the user item list is updated to indicate that the picking agent has picked the item.

Likewise, if the user places an item at a location within the materials handling facility, the item is identified and the item list associated with the user is updated. For example, if the user is a stowing agent, the stowing agent may have an associated item list identifying all the items that the stowing agent is to stow into inventory within the materials handling facility. When the stowing agent places an item into an inventory location, the item is identified and the item list is updated to indicate that the stowing agent has stowed that item.

In some implementations, the identity of items removed and/or placed into inventory locations within the materials handling facility may be identified based on data received from a variety of input devices. For example, an image capture device (e.g., a camera) may capture a series of images of the item as it is removed/placed from the inventory location. Those images may be processed to identify the item. In other implementations, an RFID tag attached to the item may be read by a RFID reader and used to identify the item. In still other examples, other input devices such as weight scales, pressure sensors, presence detection sensors, etc. may be used to detect the removal and/or placement of items at an inventory location. The identity of inventory at an inventory location may already be known and upon detection of the removal of an item, the removed item may be identified as the item associated with the inventory location.

In examples where it is determined that a user has placed an item into the inventory location, it can be determined what items where associated with the user prior to the placement of the item into the inventory location. Likewise, a stored representation of each of those items may be retrieved and compared with an image of the placed item in an effort to identify the placed item.

By detecting item actions at inventory locations and disambiguating between potential users that may have performed each item action, the movement of items within and exiting the materials handling facility may be accomplished without requiring the user to undergo additional transition of the items. For example, if the materials handling facility is a retail store, users may pick items from within the facility, place the items in a tote, cart, bag, pocket, or otherwise carry the items and the items are automatically identified and associated with the user. When the user exits the facility the items may be transitioned from the facility to the user and the user charged for the items. This may be done without the user having to undergo the additional step of checking out with a cashier, the cashier identifying and scanning each item and the user paying the cashier for the item. By removing these steps of item identification and verification by a cashier it is important that the correct items be associated with each user.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

An implementation of a materials handling facility configured to store and manage inventory items is illustrated in FIG. 1. As shown, a materials handling facility 100 includes a receiving area 120, a storage area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, storage areas 130 and transition areas 140 may be interspersed rather than segregated. Additionally, the materials handling facility 100 includes an inventory management system 150 configured to interact with each of receiving area 120, storage area 130, transition area 140 and/or users within the materials handling facility 100.

The materials handling facility 100 may be configured to receive different kinds of inventory items 135 from various suppliers and to store them until a user orders or retrieves one or more of the items. The general flow of items through materials handling facility 100 is indicated using arrows. Specifically, as illustrated in this example, items 135 may be received from one or more suppliers, such as manufacturers, distributors, wholesalers, etc. at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 may be stored or displayed together in bins, on shelves or via other suitable storage mechanisms, such that all items 135 of a given kind are stored in one inventory location within the storage area 130. In other implementations, like items 135 may be stored in different locations. For example, to optimize retrieval of certain items 135 having high turnover within a large physical facility, those items 135 may be stored in several different inventory locations to reduce congestion that might occur at a single point of storage. In general, the inventory management system 150 may maintain a mapping or location information identifying where within the materials handling facility each item is stored. Each inventory item may be associated with the corresponding inventory location in which it is stored and the association may be maintained in an inventory data store 815 (FIG. 8) accessible by the inventory management system 150. Likewise, each item may include an RFID tag and the identifier included in the RFID tag may be associated with the item and maintained in the inventory data store for user in identifying items.

When a customer order specifying one or more of items 135 is received, or as a user progresses through the materials handling facility 100, the corresponding items 135 may be selected or "picked" from inventory locations within the storage area 130. For example, in one implementation a user may have a list of items to pick and may progress through the materials handling facility picking items 135 from the inventory locations within the storage area 130. In other implementations, materials handling facility employees may pick items 135 from inventory locations within the storage area 130 using written or electronic pick lists derived from customer orders.

As discussed in more detail below, in some instances due to the location of users within the materials handling facility it may be difficult to determine which user performed an item action on a particular item within the materials handling facility. While the inventory management system can identify user's and items, when multiple users are standing near one another and an item action occurs, additional processing may be necessary to determine which of the potential users performed the item action. To illustrate, if there are three users located within a 6 foot area adjacent to an inventory location and the item action of item removal is performed on one of the items at the inventory location, additional processing may be necessary to disambiguate between the users and determine which of the three users performed the item action.

In some instances, if the users are wearing or otherwise possess an item identifier, the item identifier may be detected as the user reaches into the inventory location and again detected, along with the item identifier, as the user removes the item from the inventory location. For example, if the user identifier is located around the user's wrist, the user identifier may be detected when the user moves their hand into the inventory location and again as the user removes their hand from the inventory location. In still other implementations, the user may carry an identifier on their person (e.g., in their pocket) and their body may act as a transmitter. In such an instance, the user identifier may be detected when the user moves their hand into and out of the inventory location. Such an example of a user identifier is Microchip Technology's Bodycom™ which uses the human body's electrical field to transmit the identifier.

A detected user identifier in conjunction with the item identifier may be used to disambiguate between the multiple potential users and identify the user that performed the item action. In some instances, still further processing may be performed. For example, one or more images may be captured as the user performs the item action. Those images may be processed to determine which of the user's performed the item action.

Figure 2:
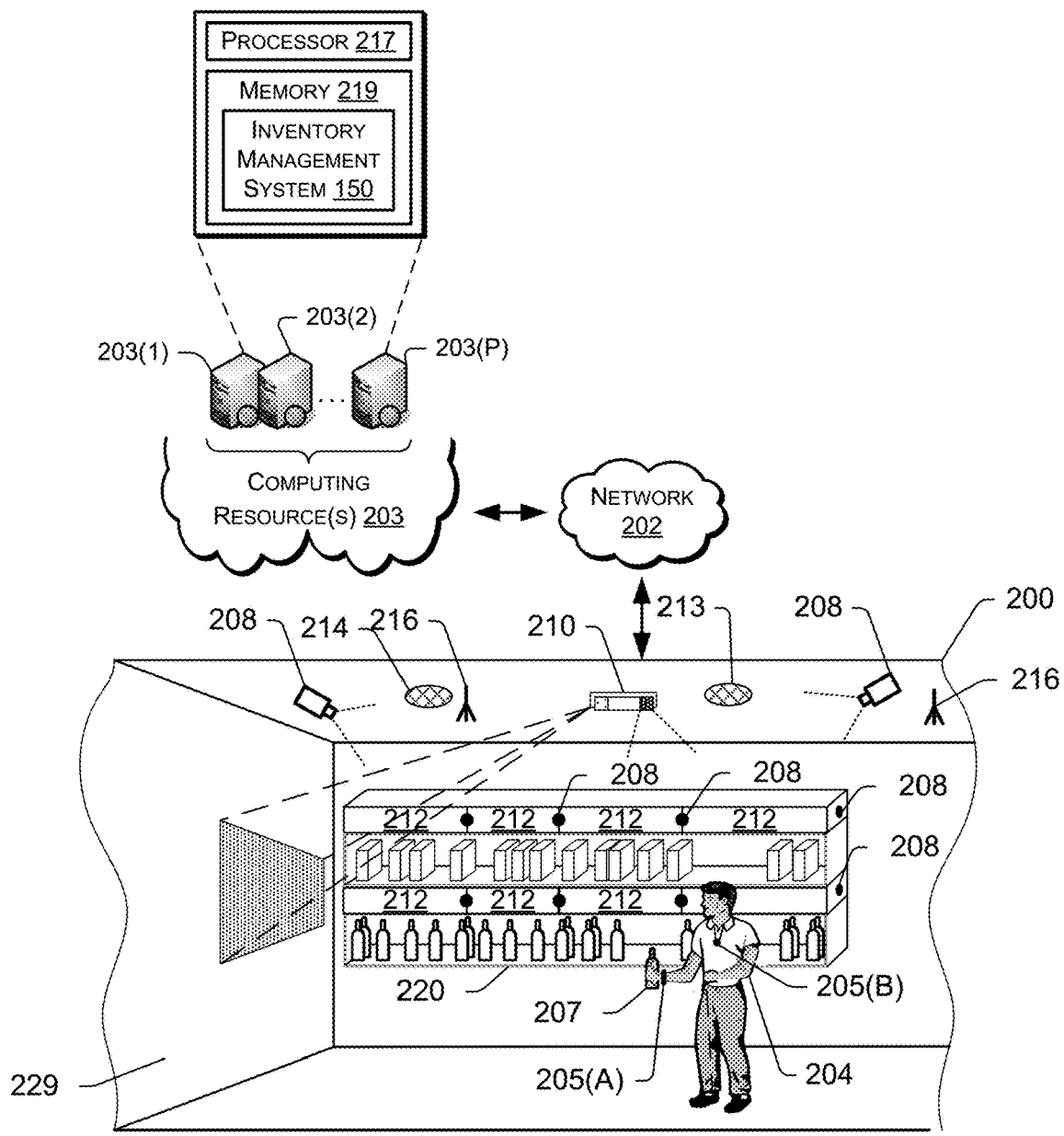
FIG. 2 is a block diagram illustrating additional details of a materials handling facility, according to some implementations.

FIG. 2 shows additional components of a materials handling facility 200, according to some implementations. Generally, the materials handling facility 200 may include one or more image capture devices, such as cameras 208. For example, one or more cameras 208 may be positioned in locations of the materials handling facility 200 so that images of locations within the materials handling facility can be captured. In some implementations, the image capture devices 208 may be positioned overhead, such as on the ceiling to capture images of user's and/or locations within the materials handling facility. In addition, in some implementations, one or more cameras 208 may be positioned on or inside of inventory locations. For example, a series of cameras 208 may be positioned on external portions of the inventory locations and positioned to capture images of user's and/or the location surrounding the inventory location. Likewise, one or more cameras 208 may be positioned within the inventory locations to capture images of items stored in the inventory locations and/or images of objects (e.g., a user's hand, items) moving into and/or out of the inventory locations.

Any type of camera and/or configuration of cameras may be used with the implementations described herein. For example, one or more of the cameras may be RGB cameras. In other implementations, one or more of the cameras may be depth sensing cameras.

In addition to camera's, other input devices, such as pressure sensors, infrared sensors, a scale, a volume displacement sensor, a light curtain, etc. may be utilized with the implementations described herein. For example, a pressure sensor and/or a scale may be used to detect when an item is added and/or removed from inventory locations. Likewise, an infrared sensor may be used to distinguish between a user's hand and inventory items.

In some implementations, a user 204 located in the materials handling facility 200 may possess a user identifier 205, such as user identifier 205(A) or user identifier 205(B). The user identifier may be temporarily provided to the user while located in the materials handling facility 200 and/or may be owned or otherwise permanently associated with the user. The user identifier may be any type of unique identifier that can be used to identify the user. For example, the user identifier may be an active tag, such as an RFID tag, a visual tag (e.g., bokocode, barcode), or any other form of identifier that can be used to store, transmit and/or otherwise be used to provide or present information that can be used to identify a user. In this example, the user 204 is wearing a user identifier 205(A) in the form of a wristband and a user identifier 205(B) in the form of a necklace. While the user 204 in this example is wearing two user identifiers, this is provided for discussion purposes only and should not be considered limiting. In other implementations, more or fewer user identifiers may be in the possession of a user 204 while in the materials handling facility.

The user 204 may also possess a portable device (not shown) and obtain information about items 207 located within the materials handling facility 200 via the portable device. Generally, the portable device has at least a wireless module to facilitate communication with the inventory management system 150 and a display (e.g., a touch based display) to facilitate visible presentation to and interaction with the user 204. The portable device may store a unique identifier and provide that unique identifier to the inventory management system 150. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances the portable device may operate in conjunction with or may otherwise utilize or communicate with one or more components of the inventory management system 150. Likewise, components of the inventory management system 150 may interact and communicate with the portable device as well as identify the user, communicate with the user via other means and/or communicate with other components of the inventory management system 150.

The inventory management system 150 may also include other input/output devices, such as projectors 210, displays 212, speakers 213, microphones 214, etc. to facilitate communication between the inventory management system 150 and the user 204. In some implementations, multiple input/output devices may be distributed within the materials handling facility. Likewise, the inventory management system 150 may also include one or more communication devices, such as wireless antennas 216 that facilitate wireless communication (e.g., Wi-Fi, Near Field Communication (NFC), Bluetooth) between the inventory management system 150 and the portable device. The inventory management system 150 may also include one or more computing resource(s) 203 that may be local to the environment (e.g., materials handling facility), remote from the environment, or any combination thereof.

The inventory management system 150 may utilize antennas 216 within the materials handling facility to create a local wireless network 202 (e.g., Wi-Fi) so that the portable device can connect to and communicate with the inventory management system 150. Likewise, in instances when one or more of the components of the inventory management system 150 are remote from the materials handling facility, they may communicate with other components of the inventory management system 150 via the network 202.

The following is an example use case for disambiguating between multiple potential users that may have performed an item action for an item at an inventory location to determine which user performed the item action. As each user enters the materials handling facility, the inventory management system 150 may identify the user (e.g., facial recognition, user ID, user provided information). Upon identifying the user, information (e.g., item retrieval history, view history, purchase history) may be retrieved from a data store. Likewise, the user may provide to the inventory management system 150 and/or have an associated pick list identifying items to be retrieved from the materials handling facility.

In some implementations, when an item action is performed (e.g., item removal and/or item placement) a user identifier associated with the user may be detected and provided to the inventory management system 150. In addition, a detected item identifier may also be provided to the inventory management system. In some implementations, an antenna array (discussed below) may be dispersed about the inventory location such that only one antenna will detect the presence of a user identifier when it is near the inventory location. When an item identifier and an item action are detected by the same antenna of the array, and/or when a user identifier and an item action are detected in the same area of the inventory location, the inventory management system 150 may utilize that information to identify the user and associate the item action with the user.

In some implementations, additional processing may be done to further disambiguate between multiple potential users and/or to increase the certainty that the identified user actually performed the item action. For example, an imaging device 208 may obtain/capture one or more images of the users 204 at the inventory location and provide the image(s) to the computing resource(s) 203 for processing. For example, when an item action (e.g., removal/placement of an item) is detected, an image of the user(s) located at the inventory location may be captured and provided to the computing resource(s) 203. The computing resource(s) 203 may process the images to determine whether an object has been removed or placed into the inventory location and/or to identify the user that performed the item action. For example, if the user that performed the item action is wearing a user identifier, such as the user identifier 205(B) in the form of a necklace, the image may be processed and the user identifier may be utilized to identify the user. In other implementations, facial recognition or other form of user identification may be performed on the images.

Once the user that performed the item action has been identified, information may be presented to the user from the inventory management system 150. For example, information may be presented to the user via a portable device and/or other output devices positioned within the materials handling facility. The portable device may be used to identify to the user a confirmation of the item for which the user performed the item action.

Figure 3:
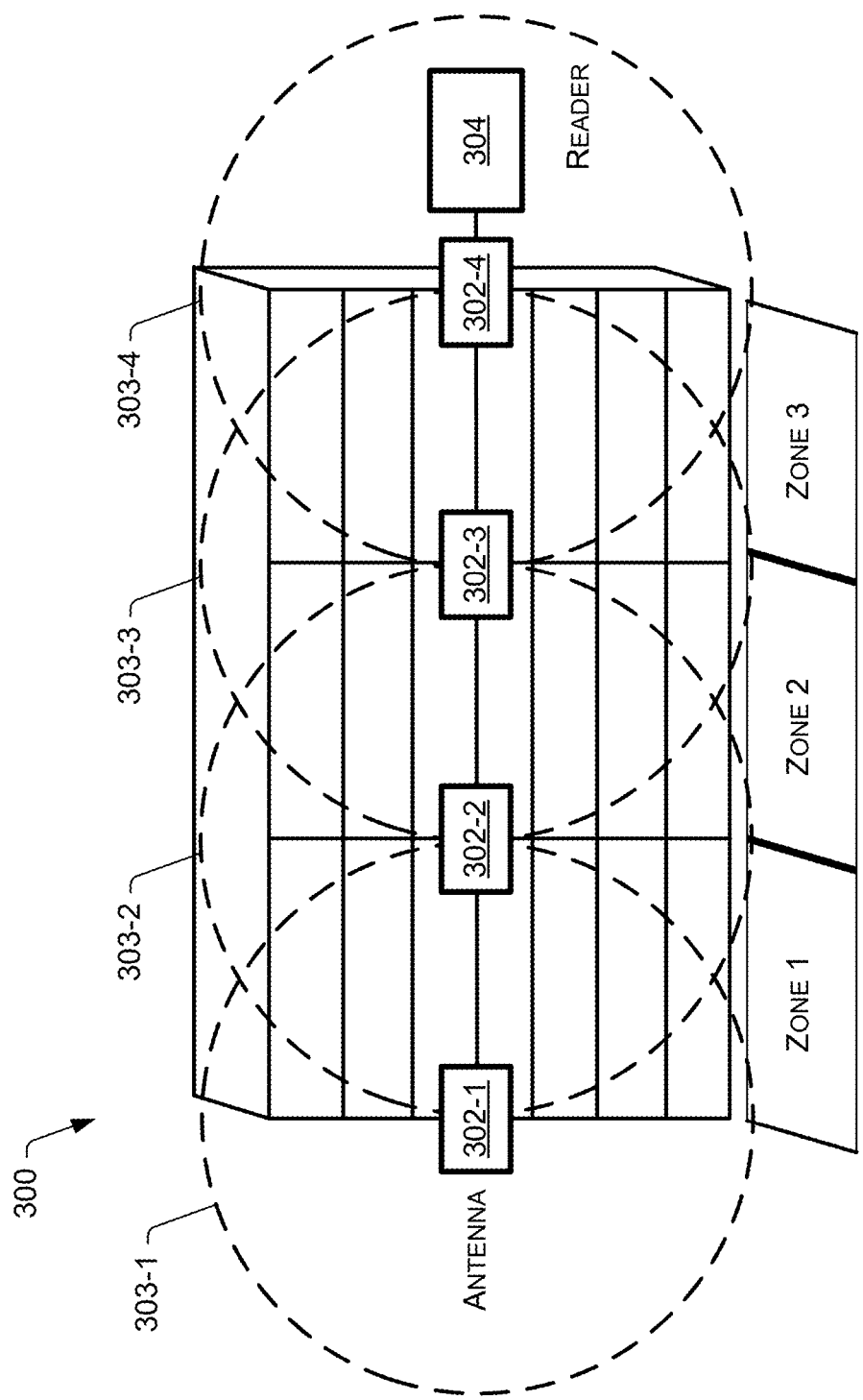
FIG. 3 is a block diagram illustrating an identifier array configuration of an inventory location within a materials handling facility of FIG. 1, according to some implementations.

FIG. 3 is a block diagram illustrating an identifier array configuration of an inventory location 300 within a materials handling facility of FIG. 1, according to some implementations. In some implementations, an inventory location 300 may be configured with an antenna array that includes multiple antennas 302 communicatively coupled to an identifier reader 304, such as an RFID reader or other active tag reader. The antennas 302 of the antenna array may be positioned within the inventory location 300 such that at least one antenna will detect the presence of a user identifier when it is within or near the inventory location. For example, the antennas 302-1, 302-2, 302-3, 302-4 may be positioned approximately three feet apart and be configured to have a detection pattern 303-1, 303-2, 303-3, 303-4 with approximately a three foot radius from the antenna. In such an implementation, each adjacent antennas detection pattern will overlap and the antenna array will cover the entire inventory location. When a user identifier enters the inventory location and/or comes within the detection pattern 303 of one or more of the antennas 302 of the antenna array, the user identifier will be detected by at least one of the antennas 302. The detection pattern may be configured such that the radius is cylindrical, covering all directions around the antenna. In other implementations the detection pattern may be configured differently. For example, in FIG. 3, the detection patterns may be configured to radiate in a vertical direction from the antennas effectively providing a vertical detection pattern that covers the front of the inventory location 300. In such an implementation, identifiers may be detected as they pass into and/or out of the inventory location and through the detection pattern.

While the example above illustrates an antenna array with four antennas positioned approximately three feet apart, in other implementations the antenna array may include more or fewer antennas that may be positioned at different locations and/or distances from one another.

Each time a user identifier is received by an antenna 302 of the antenna array, the received user identifier is provided to the identifier reader 304 along with an antenna identifier. In some implementations, the antenna may also provide a signal strength associated with the receipt of the user identifier. A user identifier that is near the antenna when the user identifier is received by the antenna will have a stronger signal strength than a user identifier that is farther away from the antenna. The identifier reader 304, which is communicatively coupled to the inventory management system 150, may provide the antenna identifier, the received user identifier and/or the received signal strength to the inventory management system 150.

In some implementations, in addition to detecting a user identifier, an antenna may also detect the presence of a new item identifier and/or the absence of a previously detected item identifier. For example, if the user reaches into the inventory location 300, an antenna 302 may detect the user identifier. If the user selects an object and removes it from the inventory location, as the user moves their hand and the item out of the inventory location the antenna may detect both the user identifier and the item identifier and provide both items of information to the identifier reader 304. Alternatively, the antenna may periodically scan for item identifiers located within its detection pattern 303 and determine that an item identifier that was previously within the detection pattern 303 is now absent.

In some implementations, the antenna 302 and/or the identifier reader 304 may also associate a time or other indicator to identify a time when the identifier was received by the antenna. The inventory management system 150 may utilize the identifiers (user and/or item), the signal strength and/or the corresponding time information as a factor in disambiguating multiple users located at a materials handling facility. For example, if the same antenna detects both an item identifier and a user identifier at or near the same time, the inventory management system 150 may establish a strong correlation that the item action (e.g., item removal) was performed by the user associated with the received item identifier. Likewise, if multiple antennas 302 of the antenna array detect a user identifier, the inventory management system may use the corresponding signal strength provided by each antenna to determine the approximate location of the user identifier with respect to the antennas of the antenna array. For example, if antennas 302-1 and 302-2 both detect the presence of a user identifier but antenna 302-1 reports a stronger signal strength, the inventory management system may determine that the user identifier is closer to antenna 302-1. Such location information may be helpful in determining which of multiple users at or near the inventory location actually retrieved the item from the inventory location.

Similar to the antenna number and configuration, in other implementations there may be fewer or additional readers 304. For example, each antenna may have its own reader 304.

Figure 4:
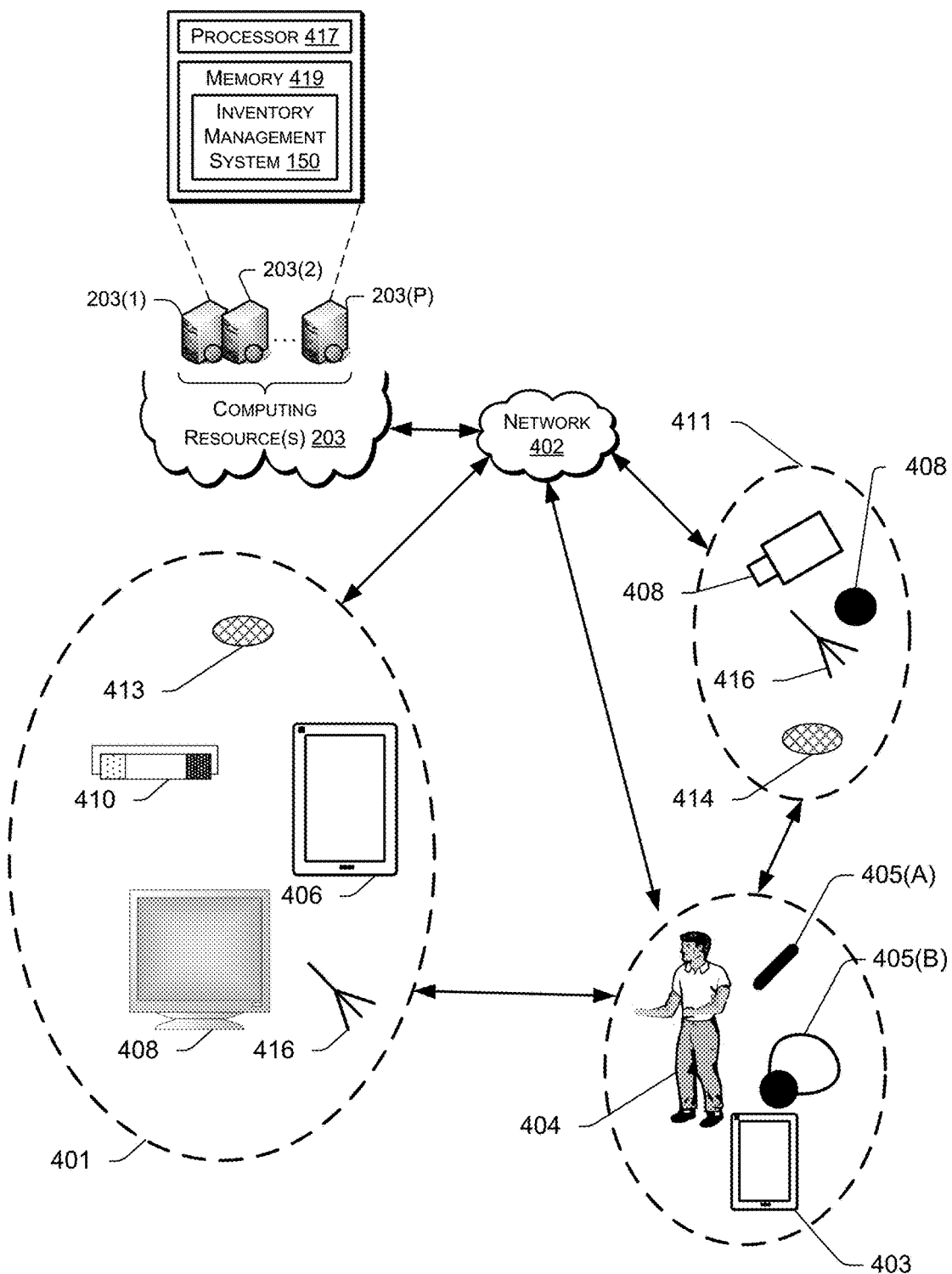
FIG. 4 shows additional components and communication paths between component types utilized in a materials handling facility of FIG. 1, according to some implementations.

FIG. 4 shows additional components and communication paths between component types utilized in an inventory management system 150 of FIG. 1, in accordance with some implementations. As discussed above, the portable device 403 or other user identifier 405(A), 405(B) may communicate and interact with various components of an inventory management system 150 over a variety of communication paths. Generally, the inventory management system 150 may include input components 411, output components 401 and computing resource(s) 203. The input components 411 may include a display 408, microphone 414, antenna 416, sensor (not shown), scale (not shown), light curtain (not shown), a volume displacement sensor (not shown) or any other component that is capable of receiving input about it surrounding environment, from the user of the portable device and/or from the portable device. The output components 401 may include a projector 410, a portable device 406, a display 408, an antenna 416, a radio (not shown), speakers 413 and/or any other component that is capable of providing output.

The inventory management system 150 may also include computing resource(s) 203. The computing resource(s) 203 may be local to the environment (e.g., materials handling facility), remote from the environment, or any combination thereof Likewise, the computing resource(s) 203 may be configured to communicate over a network 402 with input components 411, output components 401 and/or directly with the portable device 403, other user identifiers 405 and/or the user 404.

As illustrated, the computing resource(s) 203 may be remote from the environment and implemented as one or more servers 203(1), 203(2), . . . , 203(P) and may, in some instances form a portion of a network-accessible computing platform implemented as a computing infrastructure of processors, storage, software, data access, and so forth that is maintained and accessible by components/device of the inventory management system 150 via a network 402, such as the Internet. For example, the computing resources 203 may process received identifiers (user, item) and/or images to disambiguate between users and identify a user that performed an item action at an inventory location. The computing resource(s) 203 do not require end-user knowledge of the physical location and configuration of the system that delivers the services. Common expressions associated for these remote computing resource(s) 203 include "on-demand computing," "software as a service (SaaS)," "platform computing," "network-accessible platform," "cloud services," "data centers," and so forth.

Each of the servers 203(1)-(P) include a processor 417 and memory 419, which may store or otherwise have access to an inventory management system 150, which may include or provide identifier information, image processing (e.g., for user identification, user disambiguation, and/or item identification), inventory tracking, and/or location determination.

The network 402 may utilize wired technologies (e.g., wires, USB, fiber optic cable, etc.), wireless technologies (e.g., RF, IR, NFC, cellular, satellite, Bluetooth, etc.), or other connection technologies. The network 402 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 5:
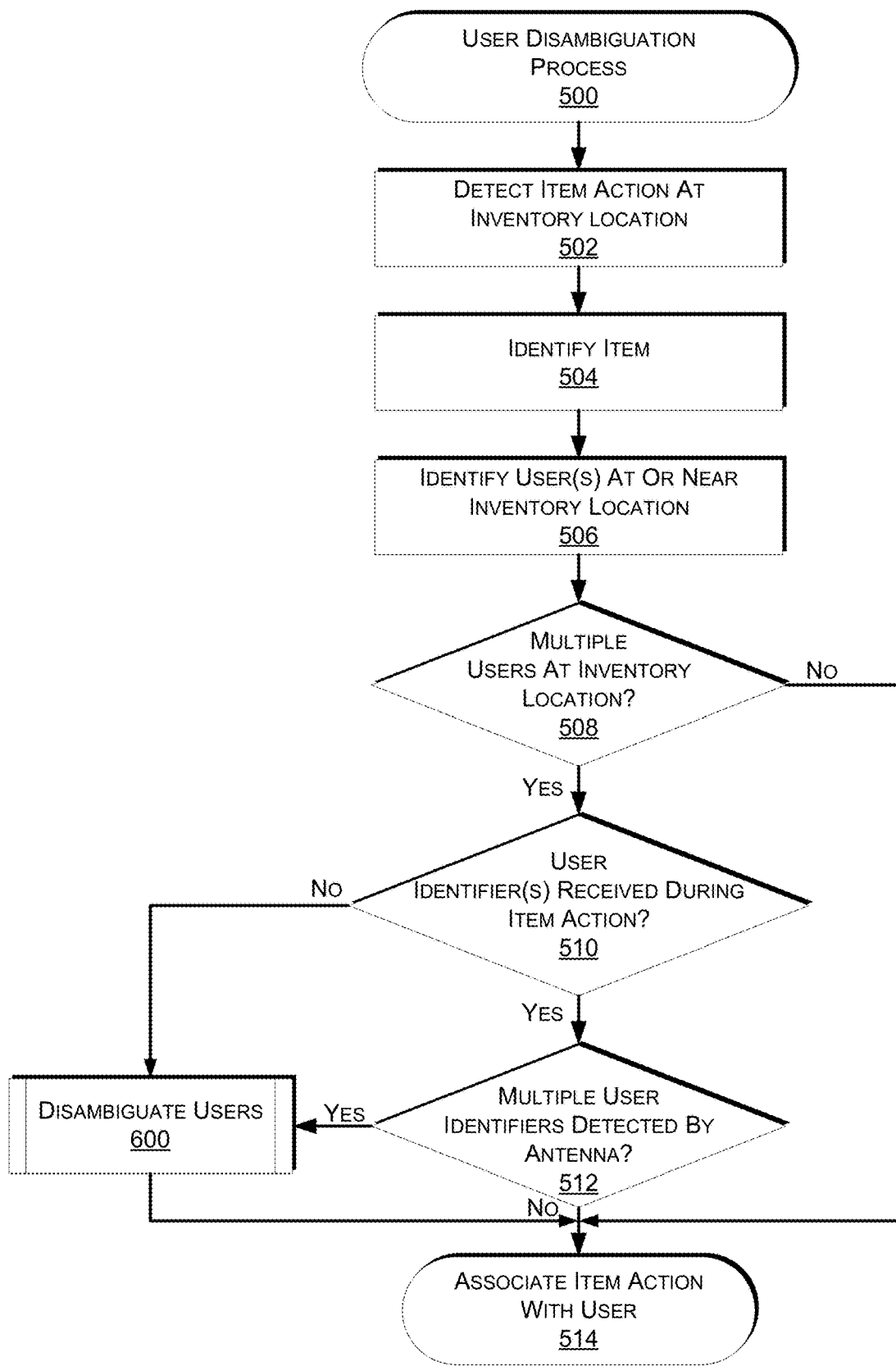
FIG. 5 depicts a flow diagram of an example process for identifying a user performing an item action, according to some implementations.

FIG. 5 depicts a flow diagram of an example process 500 for identifying a user from a group of potential users that may have performed an item action, according to some implementations. The process of FIG. 5 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 begins by detecting an item action at an inventory location, as in 502. An item action may be detected using various inputs to the inventory management system. For example, an image capture device may detect the removal/placement of an item at an inventory location. In other implementations, the inventory location may include a scale or pressure sensor that can detect when an item is removed and/or placed at an inventory location. Any change in such an input may be considered an item action (e.g., removal of an item, placement of an item).

Upon detecting an item action at an inventory location, the item for which the item action was performed is determined, as in 504. Similar to detecting an item action, identifying the item may be accomplished using a variety of techniques. For example, information as to the inventory maintained at each inventory location may be maintained and utilized to identify the item to associate with the item action. For example, if the item action is within a specific section of an inventory location (e.g., as received by an antenna of the antenna array) and only one type of inventory item is maintained at that section of the inventory location, the item may be identified. In other implementations, pressure and/or weight sensors may be maintained in the inventory locations to detect removal and/or placement of specific items. Based on maintained inventory information, the identity of a removed item may be determined.

As yet another example, each item may include an item identifier, such as an active tag (e.g., RFID) and/or visual identifier (e.g., barcode, bokode, visually distinguishing features) that can be identified to detect the identity of an item for which an item action has been performed.

In addition to identifying the item, the user(s) located at or near the inventory location that may have potentially performed the item action are identified, as in 506. Various techniques may be used to identify a user. For example, image capture and facial recognition may be used. In another example, the user may identify themself with a personal identifier (e.g., badge), RFID card, etc. In some implementations, the user has a portable device that may be detected when the user enters the materials handling facility. The portable device may include a unique identifier that is provided to the inventory management system 150 and used to identify the user. In such cases, the user may be tracked as they progress through the inventory location.

In some implementations, an imaging device 208 may also obtain/capture one or more images of the user 204 and provide the image to the computing resource(s) 203 for processing. The computing resource(s) 203 may process the image and if identifying information about the user 204 is maintained, the processed image may be compared with the stored identifying information to further verify the identity of the user. Likewise, other unique and/or temporary identifiers (e.g., the color of the user's shirt, shoes, hat, pants, the user's skeletal structure) may be identified and used to assist in identifying the user as they move around the materials handling facility. For example, if the user is wearing a bright yellow shirt, that shirt may be identified and used as a temporary identifier for use in identifying the user as they move around the materials handling facility that day. As another example, images representative of user skeletal structure may be captured. If the user is wearing a user identifier, the skeletal structure may be associated with the user identifier and used to identify the user that performed the item action.

A determination may then be made as to whether there are multiple users at or near the inventory location that may have performed the item action, as in 508. In some implementations, this may be determined based on a comparison of the distance of each user from the location of the item action. For example, if the average user has a reach of three feet, anyone within a three foot radius of the item action may be considered as the user that potentially performed the item action. In other implementations, any predetermined range may be utilized to determine if there are multiple users at or near the inventory location. In still other implementations, any user that is within a defined distance from the inventory location and/or the location of the item action may be considered as being at or near the inventory location.

If it is determined that there are multiple users at or near the inventory location, a determination is made as to whether one or more user identifiers were received during the item action, as in 510. As discussed above, a user identifier may be received by an antenna of an antenna array positioned within the inventory location as the user reaches into the inventory location and past the antenna of the antenna array. Likewise, the user identifier may be received as the user removes their hand from the inventory location and past an antenna of the antenna array. In some implementations, a user identifier may be considered as received as part of the item action if it was received within a time period of the item action occurring on the item. For example, a user identifier may be considered if it was received within five seconds of the item action (e.g., the item being removed from the shelf of an inventory location). In other implementations, a user identifier may only be considered as part of an item action if the user identifier was received within a time period of the item action and by the same antenna of the antenna array that received the item identifier.

If it is determined that no user identifiers were received, the disambiguation of users sub-process 600 is performed to determine which user actually performed the item action, as in 600. The disambiguate users sub-process 600 is discussed in further detail below with respect to FIG. 6. If it is determined that a user identifier was detected as part of the item action, a determination is made as to whether multiple user identifiers were detected, as in 512. If it is determined that multiple user identifiers were detected, the disambiguation sub-process 600 is performed with respect to the users associated with those multiple user identifiers. If it is determined that only one user identifier was received or if it is determined that there is only one user at or near the inventory location (decision block 508), the item action is associated with the user that corresponds to the user identifier, as in 514. In addition, any actions (e.g., adding the item to the user's item list or removing an item from the user item list) may be performed.

Figure 6:
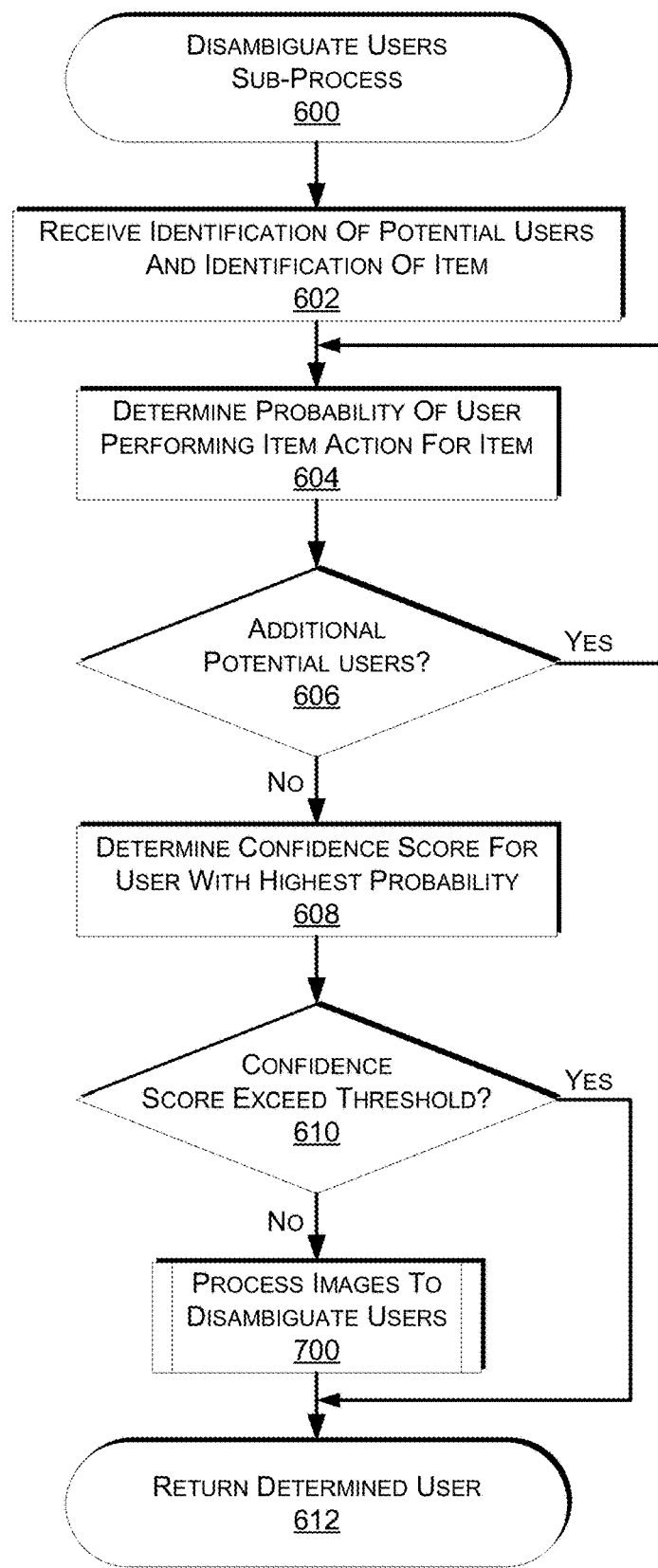
FIGS. 6-7 are flow diagrams of example sub-processes for disambiguating users, according to some implementations.

FIG. 6 is a flow diagram of example sub-processes 600 for disambiguating users, according to some implementations. The example sub-process 600 begins by receiving the identifications of the potential users and an identification of the item for which the item action was performed, as in 602. For each user a probability that the user performed the item action for that item is then determined, as in 604. Determining a probability that a potential user performed the item action may consider one or more of a variety of inputs. For example, the item may be compared to the user's past purchase behavior, the items for which the user has previously performed item actions, items included in the user item list for the user, and/or items included in the user's tote or other item carrier to determine a probability that the user performed the item action. For example, if the item action was an item placement, the item may be identified and only potential user's that previously had the placed item associated therewith may be considered. Those that did not have the item on their item list may receive a low probability.

In some implementations, other user characteristics and/or features may be considered when disambiguating between multiple potential users to determine which one performed an item action. For example, images of the user performing the item action may be processed to determine the hand used to perform the item action, the posture, size and/or shape of the user, the movement and/or gate of the user as they approached the item, the orientation of the user relative to the item, the skeletal structure of the user that performed the item action and/or other temporary or permanent characteristics of the user, etc. Such information may be compared with information associated with the user as a factor in determining the probability that the user performed the item action.

A determination is then made as to whether there are additional potential users for which a probability is to be determined, as in 606. If there are additional users to consider, the process returns to block 604 and continues for each user. However, if there are no additional potential users to consider, a confidence score for the user with the highest determined probability may be determined, as in 608. The confidence score represents the confidence that the potential user with the highest probability is the user that actually performed the item action. In some implementations, the confidence score may be determined based on the user's probability and/or other factors considered independent of other potential user. In other implementations, the confidence score may reflect the confidence, based on a comparison of the probability score for each user that the user with the highest probability performed the action. For example, if the probability of a potential user exceeds 99% (or any other determined rating), the confidence score may be set to a high rating independent of other potential user probabilities. However, if there are three potential users with respective probability scores of 85%, 35% and 15%, the user with the highest probability may receive a high confidence score because, in comparison with the other users, there is a high likelihood that the user actually performed the item action. However, if multiple users have probabilities similar to that of the highest probability, the confidence score may be lower. For example, if there are three users and they receive probability scores of 90%, 89%, 85%, the user with the highest probability score may not receive a high confidence score because there is a strong probability that any of the three users may have performed the item action.

Based on the confidence score determined for the user with the highest probability, a determination may be made as to whether the confidence score exceeds a threshold, as in 610. The threshold may be any number or score for determining that the identified potential user is the user that performed the item action. The threshold may vary depending on the number of potential users, the item associated with the item action, the price of the item associated with the item action, the identity of the user having the highest probability, the identity of other potential users, etc.

If it is determined that the confidence score does not exceed the threshold, the image disambiguation sub-process 700 may be performed, as discussed below with respect to FIG. 7. However, if the confidence score is satisfied, the user with the highest probability is determined to be the user that performed the item action and the identity of the identified user is returned, as in 612.

Figure 7:
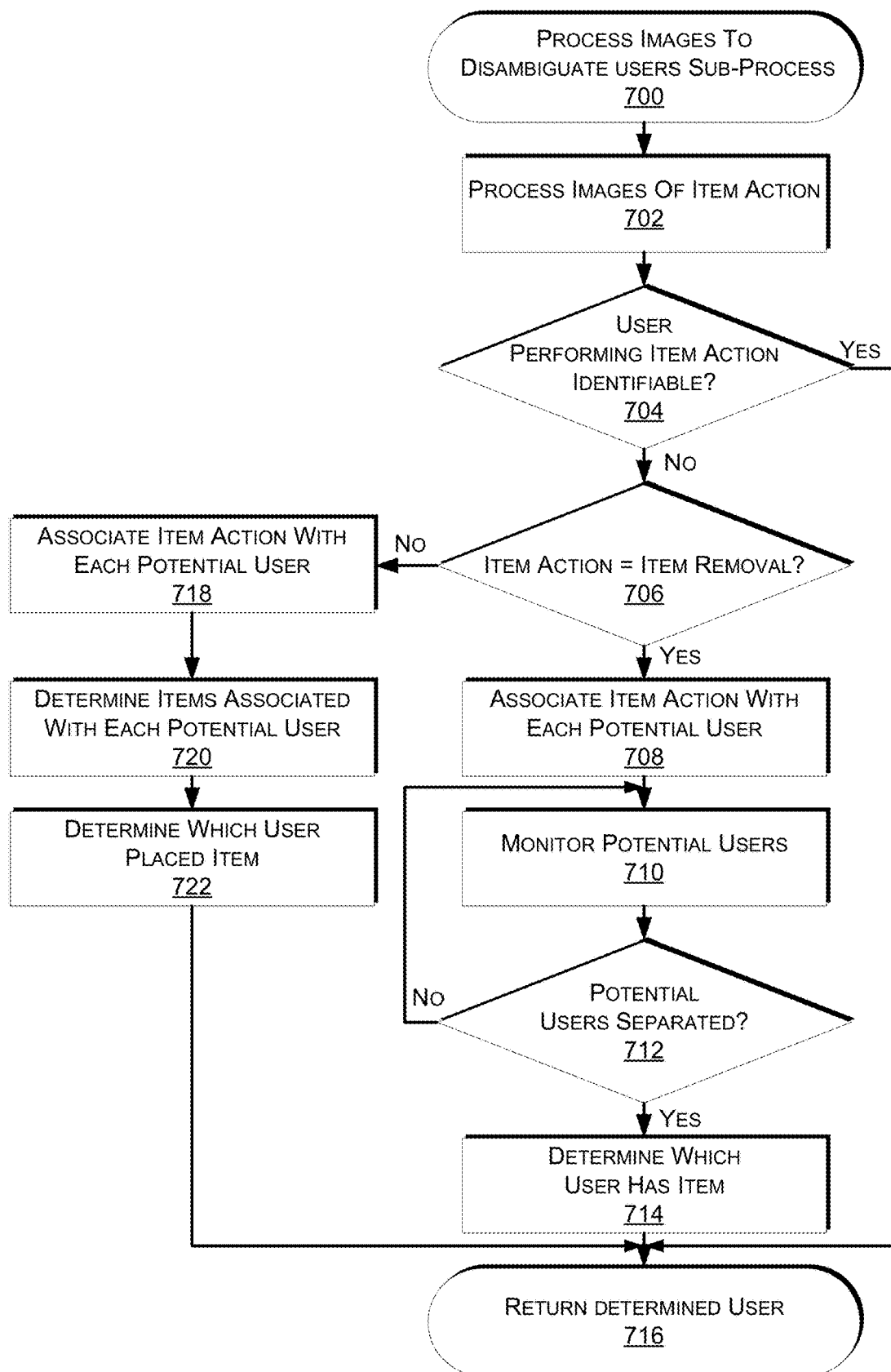

FIG. 7 is a flow diagram of an example sub-process 700 for disambiguating potential users based in image analysis. The example sub-process 700 begins by processing images captured of the user performing the item action, as in 702. The images may be processed using any image processing technique, such as facial recognition, character recognition, item matching, etc. In some implementations, for example when using facial recognition, the processed images may only need be compared with the potential users determined to be at or near the inventory location.

Based on the processed images, a determination is made as to whether the user performing the action is identifiable from the potential users, as in 704. If it is determined that the user performing the item action is identifiable, the example sub-process 700 returns the identity of the determined user, as in 716. However, if the user is not identifiable from the processed image, a determination is made as to whether the item action was an item removal, as in 706. If the item action was an item removal, the item action is associated with each potential user, as in 708, and each potential user is monitored, as in 710. As the potential users are monitored, a determination is made as to whether the users have separated, as in 712. For example, the example sub-process 700 may monitor the users to determine when one or more of them have moved a distance (e.g., 10 feet) away from the other potential user(s).

If it is determined that the potential users have not separated, the sub-process 700 returns to block 710 and continues. However, when it is determined that one or more of the potential users have separated from the other potential user(s), the example sub-process 700 determines which user has the item that was removed as part of the item action, as in 714. For example, a tote or other item carrier of each potential user may be scanned using an identifier, visual imagery, or other techniques, to determine if the user is carrying the item. In some implementations, an associate may be dispatched to determine which user has the item. Once the user carrying the item is determined the user's identity is returned, as in 716.

Returning to decision block 706, if it is determined that the item action is not an item removal (e.g., it is an item placement action), the example sub-process 700 associates the item action with each potential user, as in 718. Similar to the item addition item action, the contents of each user's item tote or other item carrier may then be scanned to determine the items associated with each potential user, as in 720. This may be done through automated processes, such as image recognition or identifier scanning, done manually (e.g., by having an associate review the item contents), by other means, or through a combination thereof. Based on the items in the user's tote or other item carrier it may be determined which of the potential user's performed the item action as the item will no longer be in their possession, as in 722. Upon determining which user performed the item action, the identity of the determined user is returned, as in 716.

Figure 8:
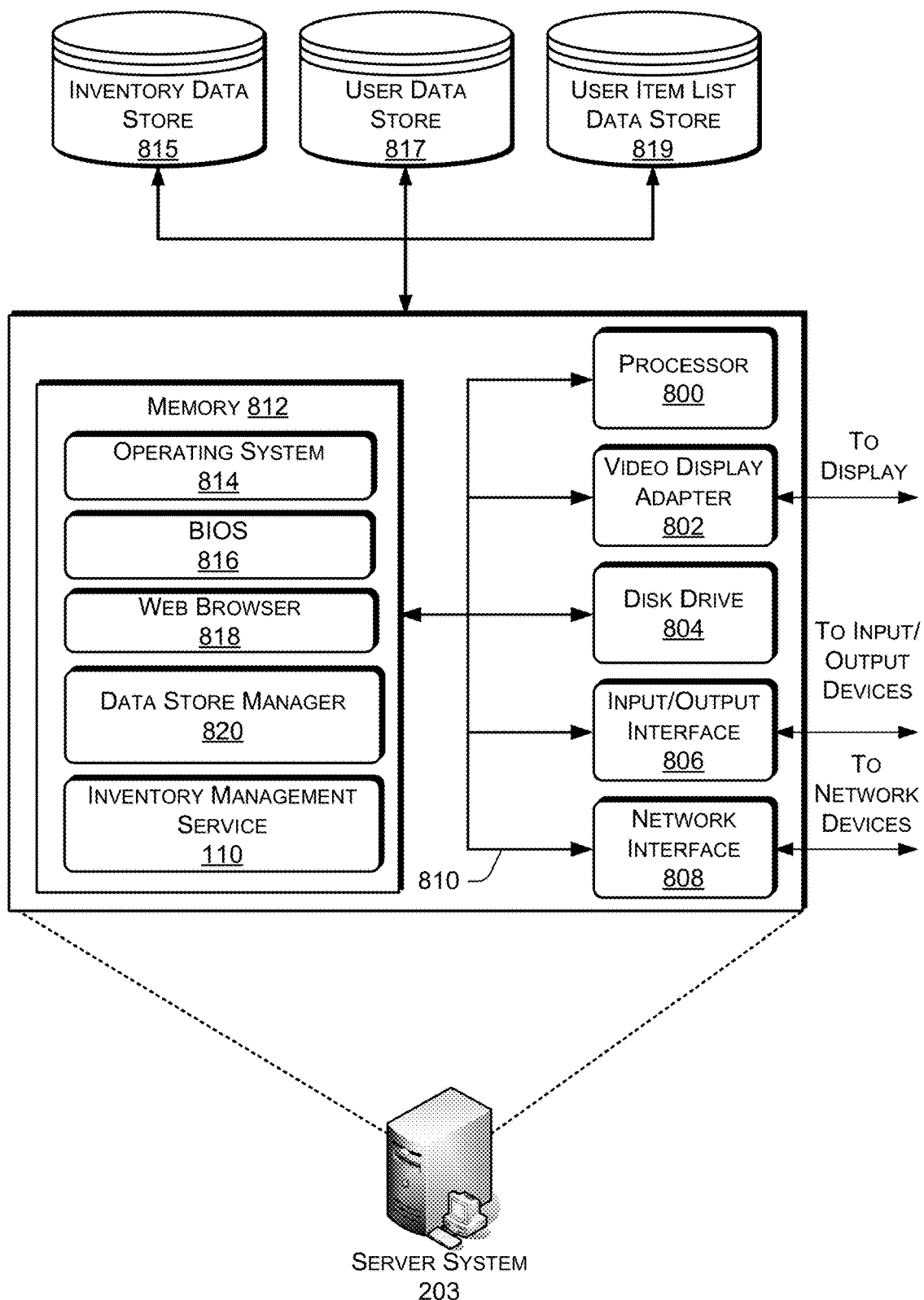
FIG. 8 is a block diagram of an illustrative implementation of a server system that may be used with various implementations, such as the remote computing resources.

FIG. 8 is a pictorial diagram of an illustrative implementation of a server system, such as the remote computing resource 203 that may be used in the implementations described herein. The remote computing resource 203 may include a processor 800, such as one or more redundant processors, a video display adapter 802, a disk drive 804, an input/output interface 806, a network interface 808, and a memory 812. The processor 800, the video display adapter 802, the disk drive 804, the input/output interface 806, the network interface 808, and the memory 812 may be communicatively coupled to each other by a communication bus 810.

The video display adapter 802 provides display signals to a local display (not shown in FIG. 8) permitting an operator of the server system 203 to monitor and configure operation of the server system 203. The input/output interface 806 likewise communicates with external input/output devices not shown in FIG. 8, such as a mouse, keyboard, scanner, or other input and/or output devices that can be operated by an operator of the remote computing resource 203. The network interface 808 includes hardware, software, or any combination thereof, to communicate with other computing devices. For example, the network interface 808 may be configured to provide communications between the server system 203 and other computing devices via the network 202, as shown in FIG. 2.

The memory 812 generally comprises random access memory (RAM), read-only memory (ROM), flash memory, and/or other volatile or permanent memory. The memory 812 is shown storing an operating system 814 for controlling the operation of the server system 203. A binary input/output system (BIOS) 816 for controlling the low-level operation of the server system 203 is also stored in the memory 812.

The memory 812 additionally stores program code and data for providing network services that allow the inventory management system 150 to track item actions (e.g., items removed from inventory locations, placed into inventory locations) and/or to disambiguate between potential users that may have performed the item actions. Accordingly, the memory 812 may store a browser application 818. The browser application 818 comprises computer executable instructions, that, when executed by the processor 800 generate or otherwise obtain configurable markup documents such as Web pages. The browser application 818 communicates with a data store manager application 820 to facilitate data exchange between the inventory data store 815, the user data store 817 and/or the user item list data store 819.

As used herein, the term "data store" refers to any device or combination of devices capable of storing, accessing and retrieving data, which may include any combination and number of data servers, databases, data storage devices and data storage media, in any standard, distributed or clustered environment. The remote computing resource 203 can include any appropriate hardware and software for integrating with the data stores 815, 817, 819 as needed to execute aspects of the inventory management system 150.

The data stores 815, 817, 819 can include several separate data tables, databases or other data storage mechanisms and media for storing data relating to a particular aspect. For example, the data stores 815, 817, 819 illustrated include mechanisms for inventory information, user information, etc. which can be used to identify an item, a user and/or disambiguate between potential users.

It should be understood that there can be many other aspects that may be stored in the data stores 815, 817, 819. The data stores 815, 817, 819 are operable, through logic associated therewith, to receive instructions from the remote computing resource 203 and obtain, update or otherwise process data in response thereto.

The memory 812 may also include the inventory management system 150, discussed above. The inventory management system 150 may be executable by the processor 800 to implement one or more of the functions of the remote computing resource 203. In one implementation, the inventory management system 150 may represent instructions embodied in one or more software programs stored in the memory 812. In another implementation, the inventory management system 150 can represent hardware, software instructions, or a combination thereof.

The remote computing resource 203, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction in FIG. 8 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:
one or more processors; and
a memory coupled to the one or more processors and storing program instructions that when executed by the one or more processors cause the one or more processors to at least:
detect, as a user enters a materials handling facility, a wearable device worn by the user;
determine a unique identifier corresponding to the wearable device;
detect, while the user is in the materials handling facility, an item action, wherein the item action occurs at a first time and includes at least one of a removal of an item from an inventory location within the materials handling facility or a placement of the item at the inventory location;

detect, concurrent with the item action, the wearable device at the inventory location;

determine the item involved in the item action; and determine, based at least in part on the detection of the item action at the inventory location and the concurrent detection of the wearable device at the inventory location, that the user performed the item action.

2. The computing system of claim 1, wherein the program instructions that when executed by the one or more processors to cause the one or more processors to detect the wearable device at the inventory location, further include instructions that when executed by the one or more processors further cause the one or more processors to at least:

detect, as the user moves a hand of the user into the inventory location, the wearable device.

3. The computing system of claim 1, wherein the wearable device includes at least one of an active tag or a visual tag.

4. The computing system of claim 1, wherein the program instructions that when executed by the one or more processors further cause the one or more processors to at least:

determine, based at least in part on the unique identifier, a pick list indicating a plurality of items to be picked by the user while the user is located in the materials handling facility.

5. The computing system of claim 1, wherein the program instructions that when executed by the one or more processors to cause the one or more processors to detect the item action, further include instructions that when executed by the one or more processors further cause the one or more processors to at least:

detect, with at least one antenna positioned at the inventory location:
information indicative of the item action; and
an item identifier corresponding to the item involved in the item action.

6. A computer-implemented method, comprising:

detecting, as a user enters a materials handling facility, a wearable device worn by the user;

detecting, while the user is in the materials handling facility, an item action, wherein the item action includes at least one of a removal of an item from an inventory location within the materials handling facility, a placement of the item at the inventory location, a removal of the item from a tote, or a placement of the item into the tote;

detecting, during the item action, the wearable device; and in response to detecting the item action and the wearable device, associating the item action with the user.

7. The computer-implemented method of claim 6, further comprising:

determining the item involved in the item action; and
associating the item with the user.

8. The computer-implemented method of claim 6, further comprising:

subsequent to associating the item action with the user, detecting the wearable device exiting the materials handling facility; and in response to detecting the wearable device exiting the materials handling facility, charging a fee to a user account associated with the user.

9. The computer-implemented method of claim 6, further comprising:

periodically detecting, as the user is in the materials handling facility and with antennas positioned at inventory locations within the materials handling facility, a unique identifier wirelessly transmitted by the wearable device.

10. The computer-implemented method of claim 6, wherein detecting the item action includes:

detecting, with at least one antenna, at least one of a presence of a new item identifier or an absence of a previously detected item identifier.

11. The computer-implemented method of claim 10, further comprising:

associate a time indicator with the detection of the presence of the new item identifier or the absence of the previously detected item identifier, the time indicator indicative of a time at which the item action occurred.

12. The computer-implemented method of claim 6, wherein detecting the item action further includes:

detecting, with at least one of a scale or a pressure sensor, a change in a weight resulting from a removal of the item from the scale or the pressure sensor or a placement of the item onto the scale or pressure sensor.

13. The computer-implemented method of claim 6, further comprising:

detecting, at a first time and with an antenna, information indicative of the item action;

detecting, with the antenna and a second time, the wearable device;

determining that the second time is within a defined time period of the first time; and wherein associating the item action with the user is based at least in part on determining that the second time is within the defined time period of the first time.

14. The computer-implemented method of claim 6, further comprising:

determining a probability that the user performed the item action; and wherein associating the item action with the user is based at least in part on the probability.

15. The computer-implemented method of claim 14, wherein the probability is based at least in part on one or more of a past purchase history of the user, items related to the user, a relationship between the item and additional items selected by the user while in the materials handling facility, a behavior presented by the user while performing the item action, items included in an item list associated with the user, an appearance of the user, a movement of the user, or an orientation of the user.

16. A system, comprising:

a plurality of antennas positioned within a materials handling facility;

one or more processors; and a memory storing program instructions that when executed by the one or more processors cause the one or more processors to at least:

receive, at a first time and from at least one antenna of the plurality of antennas and as a user enters the materials handling facility, a unique identifier wirelessly transmitted by a wearable device worn by the user;

detect, at a second time and while the user is in the materials handling facility, an item action;

receive, at the second time and from at least one antenna of the plurality of antennas, the unique identifier wirelessly transmitted by the wearable device, wherein the at least one antenna is at a location of the item action; and in response to detection of the item action and receipt of the unique identifier, associate the item action with the user.

17. The system of claim 16, wherein the at least one antenna detects, at the second time, the unique identifier as the user moves a hand into an inventory location.

18. The system of claim 16, wherein the item action is at least one of a pick of an item from an inventory location or a place of the item at the inventory location.

19. The system of claim 16, wherein the program instructions that when executed by the one or more processors further cause the one or more processors to at least:
periodically receive, while the user is in the materials handling facility and from one or more of the plurality of antennas, the unique identifier wirelessly transmitted by the wearable device.

20. The system of claim 16, wherein the program instructions that when executed by the one or more processors further cause the one or more processors to at least:
receive, at a third time and from at least one antenna of the plurality of antennas, the unique identifier; and
determine, based at least in part on antenna information corresponding to the at least one antenna from which the unique identifier was received at the third time, that the user is exiting the materials handling facility.

* * * * *